United States Patent [19]

Kennedy

[11] Patent Number: 4,895,301
[45] Date of Patent: * Jan. 23, 1990

[54] ENGINE COOLANT SYSTEM AND METHOD OF MAKING THE SAME

[75] Inventor: Billy E. Kennedy, Alcoa, Tenn.

[73] Assignee: Robertshaw Controls Company, Richmond, Va.

[*] Notice: The portion of the term of this patent subsequent to Jul. 18, 2006 has been disclaimed.

[21] Appl. No.: 351,415

[22] Filed: May 12, 1989

Related U.S. Application Data

[62] Division of Ser. No. 165,774, Mar. 9, 1988, Pat. No. 4,848,652.

[51] Int. Cl.[4] .............................................. F61P 7/02
[52] U.S. Cl. ............................. 236/34.5; 251/129.02; 251/272
[58] Field of Search .................... 236/34, 34.5, 84; 251/129.11, 129.12, 129.02, 272

[56] References Cited

U.S. PATENT DOCUMENTS

| | | | |
|---|---|---|---|
| 2,872,117 | 2/1959 | Puster | 236/34 |
| 4,114,465 | 9/1978 | Troy | 251/129.11 X |
| 4,426,036 | 1/1984 | Sliger | 236/34.5 |
| 4,495,779 | 1/1985 | Tanaka et al. | 62/211 |
| 4,523,435 | 6/1985 | Lord | 62/225 X |
| 4,595,081 | 6/1986 | Parsons | 251/129.11 X |
| 4,650,159 | 3/1987 | Schimamura | 251/129.11 X |
| 4,723,754 | 2/1988 | Tormoto et al. | 251/129.11 X |
| 4,742,989 | 5/1988 | Akagi | 251/129.11 X |
| 4,815,699 | 3/1989 | Mueller | 251/129.11 |
| 4,825,840 | 5/1989 | Hewette et al. | 251/129.11 X |

Primary Examiner—William E. Tapolcai
Attorney, Agent, or Firm—Candor, Candor & Tassone

[57] ABSTRACT

A vehicle engine coolant system and method of making the same are provided, the system having a valve construction comprising a housing provided with an inlet interconnected to the block of the internal combustion engine of the vehicle and an outlet interconnected to the radiator of the engine and being separated from the inlet by a valve seat, a movable valve member carried by the housing for opening and closing the valve seat, and an electrically operated stepper motor carried by the housing and being operatively interconnected to the valve member for positioning the valve member relative to the valve seat.

18 Claims, 3 Drawing Sheets

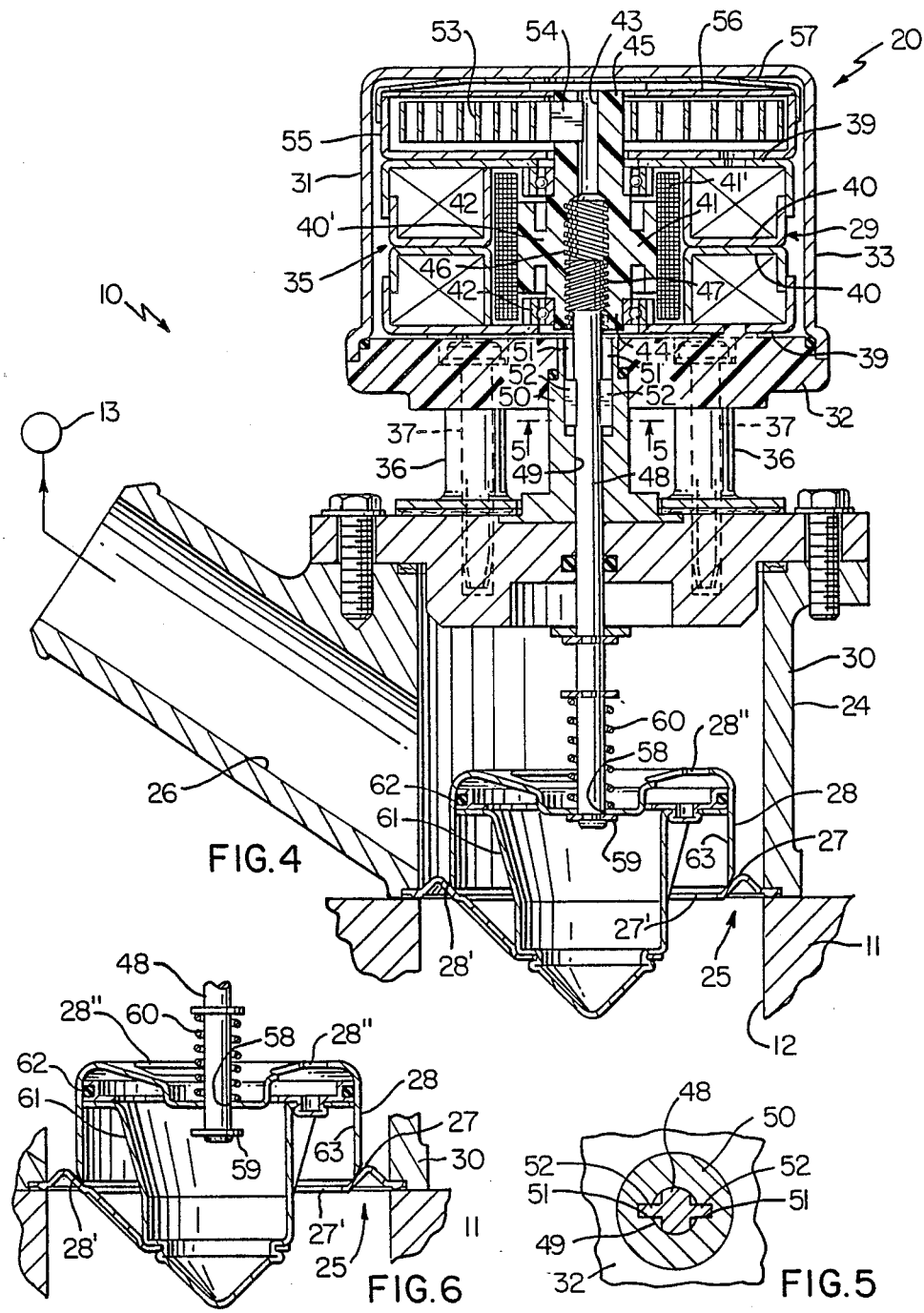

ENGINE COOLANT SYSTEM AND METHOD OF MAKING THE SAME

CROSS REFERENCE TO RELATED APPLICATION

This application is a divisional patent application of its copending parent patent application, Ser. No. 165,774 filed Mar. 9, 1988, now U.S. Pat. No. 4,848,652.

BACKGROUND OF THE INVENTION

1. Field of the Invention

This invention relates to a new vehicle engine coolant system and method of making the same.

2. Prior Art Statement

It is known to provide a vehicle engine coolant system that has a valve construction comprising a housing means provided with an inlet interconnected to the block of the internal combustion engine of the vehicle and an outlet interconnected to the radiator means of the engine and being separated from the inlet by a valve seat, a movable valve member carried by the housing means for opening and closing the valve seat, and an electrically operated solenoid means carried by the housing means and being operatively interconnected to the valve member for positioning the valve member relative to the valve seat.

It is also known to applicant to provide an exhaust gas recirculation valve construction comprising a housing means provided with an inlet and an outlet separated by a valve seat, a movable valve member carried by the housing means for opening and closing the valve seat, and an electrically operated stepper motor means carried by the housing means and being operatively interconnected to the valve member for positioning the valve member relative to the valve seat, the valve construction having spring means operatively interconnected to the valve member to move the valve member to its closed position with the valve seat upon loss of electrical current to the motor. For example, see the copending U.S. patent application of Hewette et al, Ser. No. 032,509, filed Mar. 30, 1987, now Pat. No. 4,782,811.

It is also known to have a substantially balanced valve construction in a vehicle engine coolant system. For example, see the Puster U.S. Pat. No. 2,872,117.

SUMMARY OF THE INVENTION

One feature of this invention is to provide a new vehicle engine coolant system wherein the means for positioning the valve member of a valve construction thereof relative to its valve seat can comprise an electrically operated stepper motor.

In particular, it was found according to the teachings of this invention that the valve member and the valve seat of the valve construction can be arranged so that a stepper motor can be operatively interconnected to the valve member to move the valve member relative to the valve seat.

For example, one embodiment of this invention provides a vehicle engine coolant system having a valve construction comprising a housing means provided with an inlet interconnected to the block of the internal combustion engine of the vehicle and an outlet interconnected to the radiator means of the engine and being separated from the inlet by a valve seat, a movable valve member carried by the housing means for opening and closing the valve seat, and an electrically operated stepper motor means carried by the housing means and being operatively interconnected to the valve member for positioning the valve member relative to the valve seat.

Accordingly, it is an object of this invention to provide a new vehicle engine coolant system having one or more of the novel features of this invention as set forth above or hereinafter shown or described.

Another object of this invention is to provide a new method of making a vehicle engine coolant system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is a view similar to FIG. 3 and illustrates the valve member in its closed position.

FIG. 5 is a fragmentary cross-sectional view taken on line 5—5 of FIG. 4.

FIG. 6 is a fragmentary view of the valve member and seat arrangement of FIG. 4 and illustrates the shaft of the valve member in the overrun valve member closed condition.

DESCRIPTION OF THE PREFERRED EMBODIMENT

Figure 1:
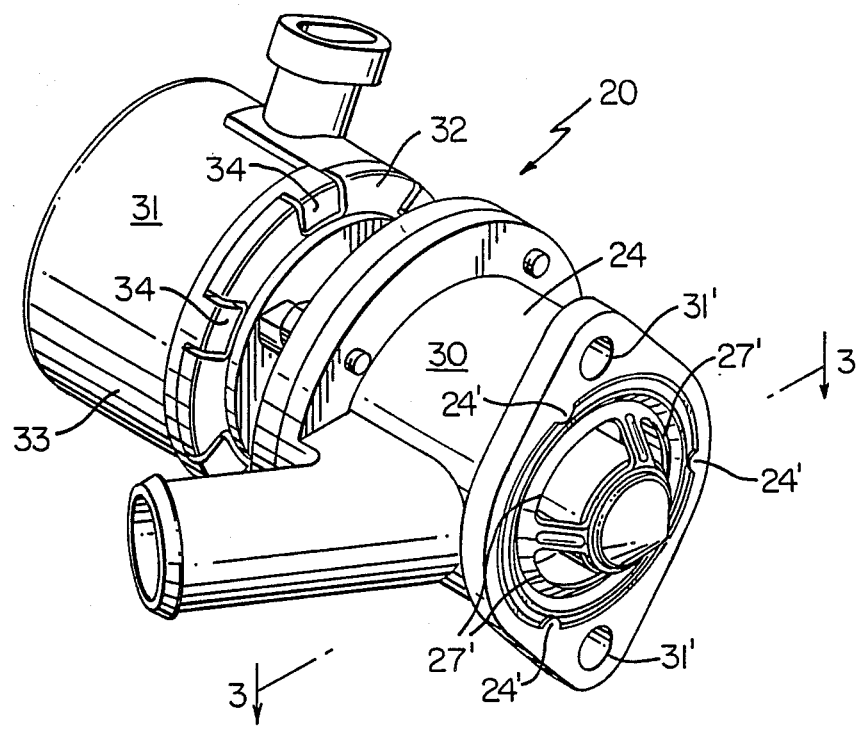
FIG. 1 is a perspective view of the valve construction for the new vehicle engine coolant system of this invention.
Figure 2:
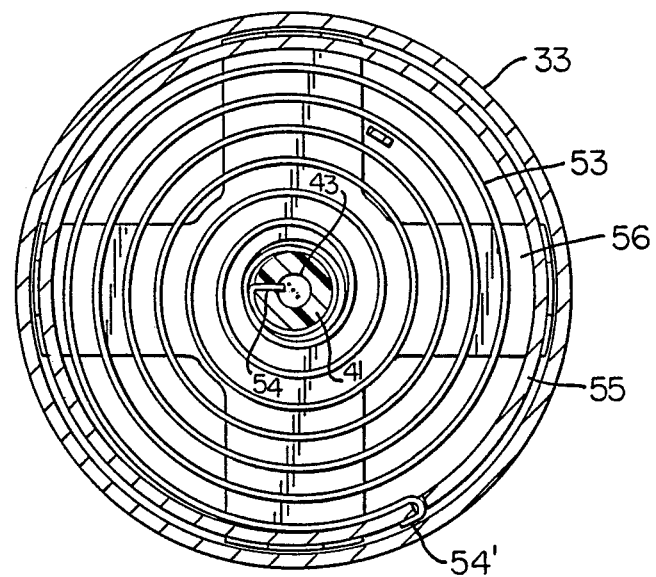
FIG. 2 is a fragmentary cross-sectional view taken on line 2—2 of FIG. 3.

While the various features of this invention are hereinafter described and illustrated as being particularly adapted to provide an engine coolant system for an automobile, it is to be understood that the various features of this invention can be utilized singly or in any combination thereof to provide an engine coolant system for other vehicles as desired.

Therefore, this invention is not to be limited to only the embodiment illustrated in the drawings, because the drawings are merely utilized to illustrate one of the wide variety of uses of this invention.

Figure 3:
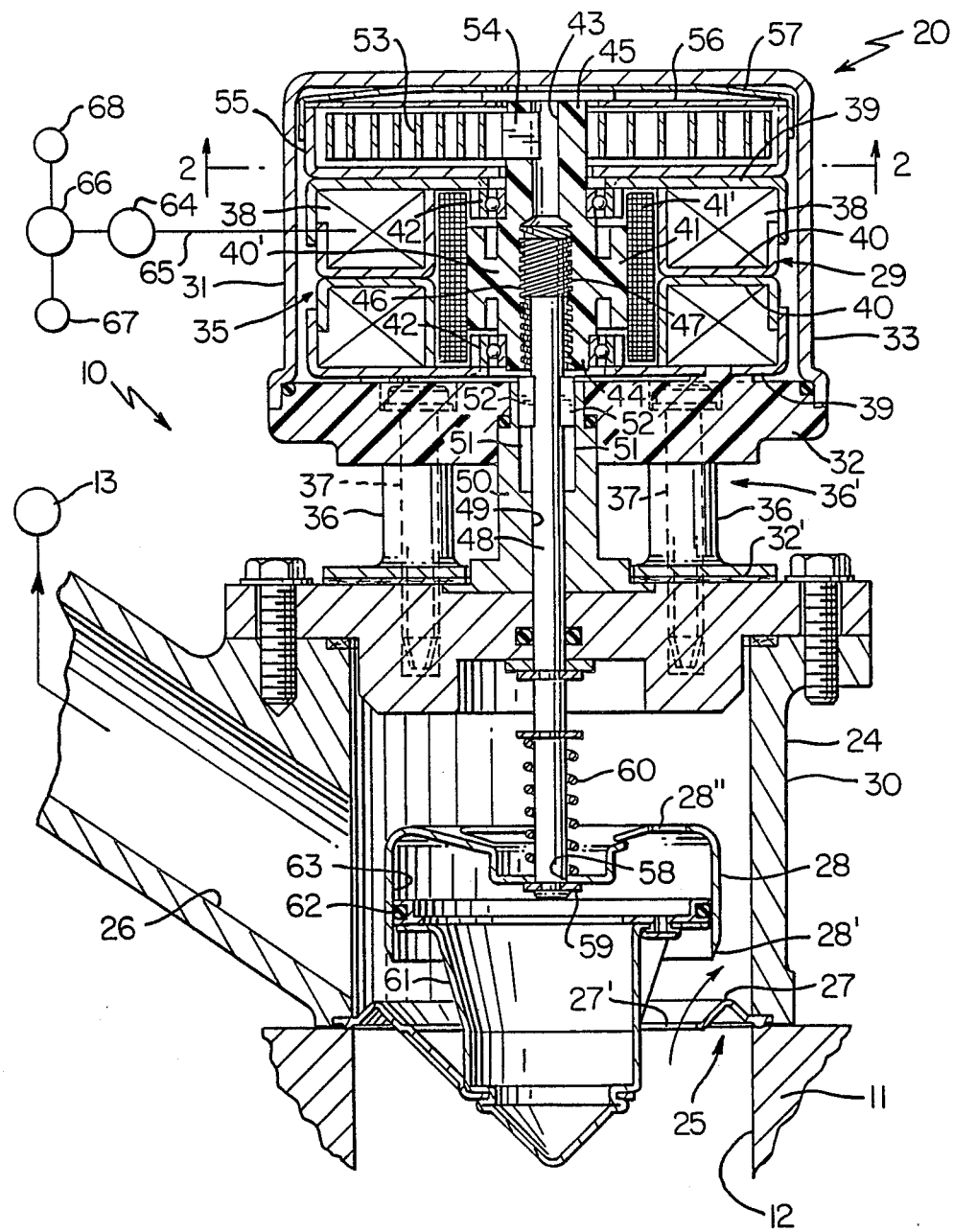
FIG. 3 is an enlarged cross-sectional view taken on line 3—3 of FIG. 1 and illustrates the valve member thereof in a fully open position thereof, FIG. 3 also schematically illustrating the vehicle engine coolant system of this invention.

Referring now to FIGS. 3 and 4, the new vehicle engine coolant system of this invention is generally indicated by the reference numeral 10 and comprises an engine block 11 having internal coolant passage means 12 and a radiation means 13 adapted to be interconnected to the passage means 12 by a valve construction of this invention that is generally indicated by the reference numeral 20, the operation of the system 10 being generally conventional in the art as fully set forth in the Sliger U.S. Pat. No. 4,248,374 and the Jackson U.S. Pat. No. 4,347,973 and the aforementioned Puster U.S. Pat. No. 2,872,117, whereby these three patents are being incorporated into this disclosure by this reference thereto.

Thus, since the reasons for and the operation of a vehicle engine coolant system are well known in the art, only the structural details of the valve construction 20 of this invention necessary for understanding the features of this invention will now be described.

As illustrated in FIGS. 1, 3 and 4, the valve construction 20 of this invention comprises a housing means 24 that is provided with an inlet 25 adapted to be interconnected to the block passage 12 and outlet 26 adapted to be interconnected with the radiator means 13 and being separated from the inlet 25 by a valve seat 27, a movable valve member 28 carried by the housing means 24 for opening and closing the valve seat 27, and a positioning means that is generally indicated by the reference numeral 29 and is carried by the housing means 24 for positioning the valve member 28 relative to the valve seat 27, the positioning means 29 of this invention comprising an electrically operated stepper motor as will be apparent hereinafter.

The housing means 24 of the valve construction 20 of this invention has a first section 30 (formed of any suitable material) containing the inlet 25, outlet 26 and valve seat 27 and having suitable openings 31' for mounting the valve construction 20 to the engine block 11 or to any other suitable structure by suitable fastening means (not shown) in a manner conventional in the art. The housing means 24 also includes another section 31 that comprises a plate means 32 and a cup-shaped casing 33 secured to the plate means 32 by turned over tangs 34 so as to define a chamber 35 therein in which the stepper motor 29 is mounted in a manner hereinafter set forth.

The housing section 31 is secured in spaced relation to the housing section 30 by suitable spacers or posts 36 through which suitable threaded fastening members 37 are utilized as indicated.

The valve seat 27 and valve member 28 are so constructed and arranged that the same provide a direct acting arrangement, i.e., the valve member 28 when moving away from the valve seat 27 to open the same moves away from the inlet 25 in the manner illustrated in FIG. 3 whereby the inlet 25 of the valve construction 20 is adapted to be disposed in fluid communication with the block passage 12 and, thus, with the radiator means 13 as long as the valve member 28 is in an open condition relative to the valve seat 27 as is conventional in the art.

In particular, the valve seat 27 comprises a metallic member that completely spans and closes the inlet 25 except for a plurality of openings 27' therethrough. The valve member 28 has an annular knife-like end 28' that will engage the valve seat 27 outboard of the openings 27' to close the seat 27 in the manner illustrated in FIG. 4.

The stepper motor means 29 comprises coil means 38 carried by cooperating cup-shaped outer casing members 39 and two cup-shaped inner casing members 40, and a central rotor 41 that is rotatably mounted to the outer casing members 39 by bearing means 42. The rotor 41 comprises a hollow cylindrical magnet 41' carried by a hub 40'.

As is well known in the art, when electrical current is directed to the coil means 38 in a certain manner, such as through suitable electrical connections to the contact pins (not shown) of the coil means 38, the rotor 41 is rotated incrementally in a certain direction for sequential current reversals to the coil means 38. The rotor 41 remains stationary for a given electrical condition until the current to the coil means 38 is reversed in the proper fashion. Because such operation of a stepper motor is well known in the art, such as set forth in the Ishida et al, U.S. Pat. No. 4,473,056, the Wessel U.S. Pat. No. 4,064,851 and the Toelle U.S. Pat. No. 4,173,203 that are incorporated by reference in the aforementioned U.S. patent application to Hewette et al, Ser. No. 032,509, filed Mar. 30, 1987, a further description of the details and operation thereof is deemed unnecessary as such three U.S. patents are being incorporated with this disclosure by this reference thereto.

However, the differences between the stepper motor 29 of this invention and the stepper motor of said Ser. No. 032,509 and the reasons for such differences will be hereinafter set forth.

The rotor 41 of the stepper motor 29 has a central opening 43 passing therethrough and interrupting the opposed sides 44 and 45 thereof, the opening 43 being internally threaded in the lower section 46 thereof so as to threadedly receive an externally threaded portion 47 of a shaft 48 that is fastened to the valve member 28 and extends through a central opening 49 of a separator member 50 disposed between the housing sections 30 and 31 as illustrated. The opening 49 in the separator 50 defines opposed axially extending slots 51 which respectively receive outwardly directed fin-like splines 52 on the shaft 48 in the manner illustrated in FIGS. 3 and 5 so as to maintain axial movement of the shaft 48 relative to the housing means 24 as the rotor 41 of the stepper motor 29 is rotated.

A spiral torsion spring 53 has an inner end 54 fastened to the rotor 41 at the side 45 thereof and an outer end 54' interconnected to a cup-shaped casing member 55 that is fastened in any suitable manner to the casing 39 of the stepper motor 29 and thus becomes fixed to the housing means 24.

In this manner, it can be seen that the spiral torsion spring is coiled between its ends 54 and 54' about an axis that is in aligned relation with the shaft 48 of the valve member 28.

The stored energy of the spiral torsion spring increases in proportion to the distance between the valve member 28 and the valve seat 27 when the stepper motor 29 moves the valve member 28 from its fully open condition of FIG. 3 towards its fully closed position as illustrated in FIG. 4. In this manner, should the stepper motor 29 fail or electrical current to the stepper motor 29 terminate for any reason while the valve member 28 is in a closed position relative to the valve seat 27, the stored energy of the spiral spring 53 causes the rotor 41 to rotate relative to the housing means 24 in a direction that causes the shaft 48 to axially move upwardly in FIG. 3 and open the valve member 28 relative to the valve seat 27 a sufficient amount whereby the block passage 12 will always be interconnected to the radiator means 13 under this condition of a loss of electrical current so as to protect the engine from overheating.

In particular, it was found according to the teachings of this invention that it is not necessary to open the valve member 28 completely away from the valve seat 27 during a loss of electrical current to the stepper motor 29 because the direct acting valve arrangement 27, 28 is of a quick opening design and small increments of opening movement of the valve member 28 near its closed position results in larger increases in flow through the thus opened valve seat 27 and thereby permits a sufficient amount of coolant to flow to the radiator means 13 so as to protect the engine from overheating whereby this arrangement allows the size of the spiral torsion spring 53 to be minimized and the stresses to be kept at a low level for long life.

In addition, it was found according to the teachings of this invention that the force available at the output shaft for a stepper motor of a given design, size and cost, is a limiting factor in the design of the valve construction 20 of this invention. Furthermore, this output force of the stepper motor is found to be reduced by a rise in coil temperature, i.e. the resistance increases with increasing temperature and therefore the current decreases.

The coil temperature of the stepper motor 29 increases due to self-heating and due to the assembly being mounted on an engine with hot coolant flowing therethrough. Therefore, the stepper motor 29 is designed to be protected from heat, as in the aforementioned application, Ser. No. 032,509, by the part 32 being a heat insulator at one end of the post means 36 and the gasket means 32' being a heat insulator at the other end of the post means 36 so as to provide a heat insulating air gap 36' between the motor means 29 and the housing means 30 as illustrated in FIG. 3.

While the particular stepper motor being utilized with the exhaust gas recirculation valve construction of application, Ser. No. 032,509 in one working embodiment thereof and the stepper motor 29 of a particular working embodiment of the valve construction 20 of this invention are of the same size and make the same angular movement per step of approximately 7.5°, the force output of the stepper motor 29 of the one working embodiment of the valve construction 20 of this invention is much greater as a greater force is required to close the valve member 28 against the valve seat 27 because of the hydrodynamic effect of the coolant flow in the engine block 11 tending to flow out of the passage 12 to the passage 26 as is well known in the art.

This increased force of the stepper motor 29 of the one working embodiment of the valve construction 20 of this invention is obtained by using a higher energy ferrite rotor magnet material 41' and a more efficient thread means 46 and 47 of the rotor 41 and shaft 48, such as a 0.250-16 Acme thread, whereas the stepper motor in the one working embodiment of the application, Ser. No. 032,059, uses a four start thread on the motor shaft so that the 0.250 total stroke thereof can be completed with one rotor revolution where thereby limits the load increase in the torsion spring thereof and is accomplished by approximately 0.0052 of an inch stroke for 48 steps. In contrast, the one working embodiment of the stepper motor 29 of the valve construction 20 of this invention uses a single start thread (16 threads per inch) which produces approximately 0.0013 inches of an inch stroke per step for 192 steps for the same stroke of approximately 0.250 on an inch. Therefore, the load change in the torsion spring 53 is much greater in the stepper motor 29 of the one working embodiment of this invention than the stepper motor of the one working embodiment of the application Ser. No. 032,509. However, since one does not want to use all of the motor output force just to wind the spring 53, the initial load (with the valve member 28 open) must be less for the stepper motor 29 of this invention than for the stepper motor of the application Ser. No. 032,509.

Thus, when compared to the stepper motor of the one working embodiment of application Ser. No. 032,509, the higher energy ferrite magnet material 41' of the stepper motor 29 of the one working embodiment of this invention produces a higher non-energized detent torque so that more force is required to turn the rotor 41 when the electrical power to the stepper motor 29 is off. Thus, in the one working embodiment of the valve construction 20 of this invention, the torsion spring 53 upon a loss of electrical current to the stepper motor 29 does not open the valve member 28 from the valve seat 27 to its fully open position therewith but merely opens the same partially with the understanding that that particular partial opening ill fully protect the engine from overheating because sufficient coolant flow is obtained through the partially open valve member 28 with the first increment of opening thereof for the reasons previously set forth.

Since the stepper motor 29 is required to exert its greatest force at the end of the closing stroke thereof when the valve member 28 is closed against the valve seat 27, and since the maximum length of the valve member 28 is exposed to the coolant flow, the valve member 28 must have its seat 28' be brought into alignment with the valve seat 27 and a seating force, not just contact, must be generated between the valve member 28 and the valve seat 27. At this point, the maximum force is also stored in the torsion spring 53.

If desired, suitable spider spring-like plates 56 and 57 can be utilized to close the open end of the spring casing 55 to load the parts inside the housing section 31 to hold the same in the assembled relation as illustrated and as set forth in the aforementioned application, Ser. No. 032,509.

The valve member 28 and valve seat 27 are so constructed and arranged that the same comprise a very closely balanced valve arrangement when the valve member 28 is closed against the valve seat 27 in a manner similar to the balanced valve arrangement of aforementioned Puster U.S. Pat. No. 2,872,117.

In particular, the valve member 28 has the shaft 48 pass through an opening 58 thereof and is held against an end retainer 59 of the shaft 48 by an overrun coiled compression spring 60 that is telescoped on the shaft 48 and permits the shaft 48 to be driven further in a valve closing direction when the valve member 28 is closed against the valve seat 27 as illustrated in FIG. 6, the valve seat 27 having a central part 61 fixed thereto and provided with an annular seal 62 that seals against the inside surface 63 of the valve member 28 and thereby permits the valve member 28 to slide relative thereto while sealing the opposed sides of the central part 61 from each other as fluid at the inlet 25 is adapted to pass through opening means 27' in the valve seat 27 to engage against the underside of the central portion 61 and fluid in the passage 26 is adapted to be exposed to the upper side of the central portion 61 through suitable opening means 28" formed through the closed end of the valve member 28 as illustrated.

Thus, with the valve member 28 closed against the valve seat 27, the seal 62 and the central part 61 resist the load that would be imposed upon the "closed" end of the valve member 28 leaving only the area defined by the material thickness of the valve member 28 to be acted upon by the pressure drop across the valve member 28 so that statically, the valve means 27, 28 is very close to being balanced in its closed condition.

During the making of the valve construction 20 of this invention, the valve seat 27 is fixed to the housing means 24 in any suitable manner, such as by staking the housing means 24 over the assembled valve seat as indicated by reference numerals 24' in FIG. 1.

Since stepper motors have the characteristic that if in stepping forward, the motor shaft is presented with a load that cannot be moved by the maximum motor force output, the stepper motor will step backwards. Thus, the overrun spring 60 of the valve construction 20 of this invention will collapse before the stepper motor's maximum force is exceeded and thereby will avoid opening of the valve member 28 relative to the valve seat 27 when it should be in a closed condition thereof.

In particular, when the stepper motor 29 is operated by electrical pulses being directed thereto to move the open valve member 28 to its closed position against the valve seat 27, the stepper motor 29 actually closes the valve member 28 against the valve seat 27 as illustrated in FIG. 4 and continues to axially move the shaft 48 downwardly in the manner illustrated in FIG. 6 to thereby cause the collapsing of the spring 60 because it would be relatively difficult to design a program wherein the pulses to the stepper motor 29 will cause the same to move the shaft 48 in such a manner that the valve member 28 only makes closing contact with the valve seat 27. Thus, with such overrun arrangement of the shaft 48 and valve member 28 through the collapse of the spring 60, the stepper motor 29 when closing the valve member 28 against the valve seat 27 will not cause the valve member 28 to open because of the aforementioned feature of a stepper motor stepping backwards when presented with a load that cannot be moved by the motor's maximum force output.

By having the size of the opening 58 in the valve member 28 larger than the size of the shaft 48 passing therethrough, the force of the overrun spring 60 tending to move the valve member 28 against the retainer 59 permits a swivel movement of the valve member 28 on the shaft 48 so that the valve member 28 can easily adjust to the plane of the valve seat 27 when closing thereagainst and thereby provide for more accurate alignment of the valve member 28 with the valve seat 27 and thereby provide less leakage therethrough.

The pulses to the stepper motor 29 can be directed by an electronic module 64 through lead means 65 as illustrated schematically in FIG. 3, the module 64, in turn, being controlled by an engine computer 66 that responds to a temperature sensor 67 whose output signal is a function of the automobile engine coolant temperature whereby the coolant flow through the valve means 27, 28 to the engine radiator means 13 will be a function of the coolant temperature and the engine computer's program. Also, it is to be understood that the computer 66 can receive other signals from other devices, such as device 68, as is well known in the art, such as ambient temperature signals, engine load signals, vehicle speed signals, passenger compartment temperature signals, etc.

Therefore, it can be seen that the vehicle engine coolant system 10 of this invention can be made in a relatively simple manner by the method of this invention to operate in a manner now to be described.

As previously stated, the vehicle engine coolant system 10 of this invention is adapted to have the inlet 25 of the valve construction 20 interconnected to the block passage 12 of an internal combustion engine of an automobile or the like and have its outlet 26 interconnected to the radiator means 13 of such engine so that suitable electrical signal sending means 64 can cause the opening and closing of the valve member 28 relative to the valve seat 27 a certain amount to permit a certain portion of the coolant of the engine to be circulated through the radiator means 13 of the engine for a reason well known in the art.

The stepper motor 29 of the valve construction 20 of this invention steps the rotor 41 through various degrees of rotation thereof for each current reversal received by the coil means 38 so as to position the valve member 28 relative to the valve seat 27 to control the amount of circulation of coolant through the valve construction 20.

Thus, it can be seen that the stepper motor 29, through rotation of the rotor 41, causes axial movement of the shaft 48 of the valve member 28 to position the valve member 28 relative to the valve seat 27, the closing movement of the rotor 41 causing the spiral torsion spring 53 to be wound in a direction to store energy therein so that should the stepper motor 29 fail or electrical current be terminated to the stepper motor 29 for any reason while the valve member 28 is in a closed or partially closed position relative to the valve seat 27, the spiral torsion spring 53 will cause the rotor 41 to rotate in a direction to cause the valve member 28 to open away from the valve seat 27 a distance sufficient to permit an amount of coolant to be circulated from the engine block 11 to the radiator means 13 to prevent the engine from overheating under this condition.

Of course, the stepper motor 29 itself can move the valve member 28 to its fully open position away from the valve seat 27 upon the proper sequential current reversals being directed to the coil means 38 to cause the rotor 41 to rotate in a direction that causes upper axial movement of the shaft 48 in FIG. 3 to fully open the valve member 28 away from the valve seat 27. It does not require a failure of the motor means 29 nor a loss of current to the coil means 38 to provide for such opening movement of the valve member 28 relative to the valve seat 27.

Thus, it can be seen, that at a relatively slow step rate for the stepper motor 29, such as 40 steps per second, the valve poppet 28 can travel from full closed to full open in less than 5 seconds. Therefore, the valve construction 20 of this invention can have its valve poppet 28 respond much faster than a conventional thermostatic valve poppet positioned by a wax-type thermal assembly. Of course, the stepper motor 29 of this invention can be operated at a step rate faster than 40 steps per second, but it is to be understood that it is a characteristic of stepper motors that at some step rate the force output of the stepper motor will start to decrease with increasing rates.

Accordingly, it can be seen that the system 10 of this invention provides an electro-mechanical actuation of a vehicle engine's coolant flow valve so that the engine's temperature may be a function of various parameters, for example, ambient temperature, engine load, speed, passenger compartment temperature, etc. Also, the system 10 of this invention will control the engine temperature more closely by providing precise, incremental coolant valve poppet positioning, will provide a temperature controlled valve that will respond to a temperature change quickly, will allow the coolant system to be filled easily initially (by providing an electrical signal to open the valve fully or no signal to open the valve partially), will provide a low leakage valve design for fast engine warmup (a leakage path around the valve poppet 28 not being necessary since the valve poppet 28 may be opened electrically for initial system filling), will provide open positioning in the event of loss of electrical signal, will provide direct electronic control of the engine temperature through the engine control computer, will provide a stepper motor operated valve that will function in an automotive environment, etc.

Therefore, it can be seen that this invention provides a new vehicle engine coolant system and method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a vehicle engine coolant system having a valve construction comprising a housing means provided with an inlet interconnected to the block of the internal combustion engine of said vehicle and an outlet interconnected to the radiator means of said engine and being separated from said inlet by a valve seat, and a movable valve member carried by said housing means for opening and closing said valve seat, the improvement comprising electrically operated stepper motor means carried by said housing means and being operatively interconnected to said valve member for positioning said valve member relative to said valve seat, and spring means operatively interconnected to said valve member to move said valve member to an open position thereof with said valve seat upon loss of electrical current to said motor means, said open position being less than a fully open position of said valve member but being 2. A system as set forth in claim 1 wherein said spring means comprises a torsion spring.

3. A system as set forth in claim 1 wherein said spring means has the force thereof increased as said valve member moves in a closing direction toward said valve seat.

4. A system as set forth in claim 1 wherein said motor means has a rotatable rotor threadedly interconnected to said valve member to cause axial movement of said valve member upon rotatable movement of said rotor, said spring means comprising a torsion spring that has opposed ends one of which is interconnected to said rotor and the other of which is interconnected to said housing means, said spring means being wound up by said rotor as said rotor rotates in a direction that causes axial movement of said valve member in a closing direction toward said valve seat.

5. A system as set forth in claim 4 wherein said rotor has a central opening therein that is internally threaded, said valve member having a shaft extending therefrom and having a portion thereof being externally threaded and threadedly received in said internally threaded opening of said rotor to threadedly interconnect said rotor and said valve member together.

6. A system as set forth in claim 5 wherein said spring means comprises a spiral torsion spring.

7. A system as set forth in claim 6 wherein said spiral torsion spring is coiled between said ends thereof about an axis that is substantially aligned with the longitudinal axis of said shaft.

8. A system as set forth in claim 5 wherein said valve member and said valve seat respectively have means that cooperate together to substantially balance said valve member when said valve member is in the closed condition thereof with said valve seat.

9. A system as set forth in claim 5 wherein said valve member has an opening means passing therethrough and telescopically receiving said shaft therein, said shaft having an abutment means thereon, and an overrun spring means carried by said shaft and tending to bias said valve member against said abutment means whereby said valve member tends to move in unison with said shaft and whereby said shaft can continue to move in a valve member closing direction after said valve member has been closed against said valve seat.

10. In a method of making a vehicle engine coolant system having a valve construction that comprises the steps of forming a housing means with an inlet interconnected to the block of the internal combustion engine of said vehicle and an outlet that is interconnected to the radiator means of said engine and is separated from said inlet by a valve seat, and forming a movable valve member to be carried by said housing means for opening and closing said valve seat, the improvement comprising the steps of forming an electrically operated stepper motor means to be carried by said housing means and be operatively interconnected to said valve member for positioning said valve member relative to said valve seat, and operatively interconnecting a spring means to said valve member to move said valve member to an open position thereof with said valve seat upon loss of electrical current to said motor means, said open position being less than a fully open position of said valve member but being sufficiently open to permit enough coolant to circulate through said radiator to prevent overheating of said engine.

11. A method of making a system as set forth in claim 10 and including the step of forming said spring means to comprise a spiral torsion spring.

12. A method of making a system as set forth in claim 10 and including the step of arranging said spring means so as to have the force thereof increase as said valve member moves in a closing direction toward said valve seat.

13. A method of making a system as set forth in claim 10 including the steps of forming said motor means to have a rotatable rotor that is threadedly interconnected to said valve member to cause axial movement of said valve member upon rotatable movement of said rotor, forming said spring means to comprise a spiral torsion spring that has opposed ends one of which is interconnected to said rotor and the other of which is interconnected to said housing means, and arranging said spring means so as to be wound up by said rotor as said rotor rotates in a direction that causes axial movement of said valve member in a closing direction toward said valve seat.

14. A method of making a system as set forth in claim 13 and including the steps of forming said rotor to have a central opening therein that is internally threaded, and forming said valve member to have a shaft extending therefrom and having a portion thereof being externally threaded and threadedly received in said internally threaded opening of said rotor to threadedly interconnect said rotor and said valve member together.

15. A method of making a system as set forth in claim 14 and including the step of interconnecting said spring means to said rotor on the side thereof that is opposite to the side thereof that faces said valve member.

16. A method of making a system as set forth in claim 15 and including the step of forming said torsion spring to be coiled between said ends thereof about an axis that is substantially aligned with the longitudinal axis of said shaft.

17. A method of making a system as set forth in claim 14 and including the step of forming said valve member and said valve seat to respectively have means that cooperate together to substantially balance said valve member when said valve member is in the closed condition thereof with said valve seat.

18. A method of making a system as set forth in claim 14 and including the steps of forming said valve member to have an opening means passing therethrough and telescopically receiving said shaft therein, forming said shaft to have an abutment means thereon, and disposing an overrun spring means to be carried by said shaft and tend to bias said valve member against said abutment means whereby said valve member tends to move in unison with said shaft and whereby said shaft can continue to move in a valve member closing direction after said valve member has been closed against said valve seat.

* * * * *

UNITED STATES PATENT AND TRADEMARK OFFICE
CERTIFICATE OF CORRECTION

PATENT NO. : 4,895,301
DATED : January 23, 1990
INVENTOR(S) : Billy E. Kennedy

It is certified that error appears in the above—identified patent and that said Letters Patent is hereby corrected as shown below:

Column 9, line 40, after "being" insert --sufficiently open to permit enough coolant to circulate through said radiator to prevent overheating of said engine.--.

Signed and Sealed this

Twenty-seventh Day of November, 1990

Attest:

HARRY F. MANBECK, JR.

*Attesting Officer*  *Commissioner of Patents and Trademarks*